UNITED STATES PATENT OFFICE.

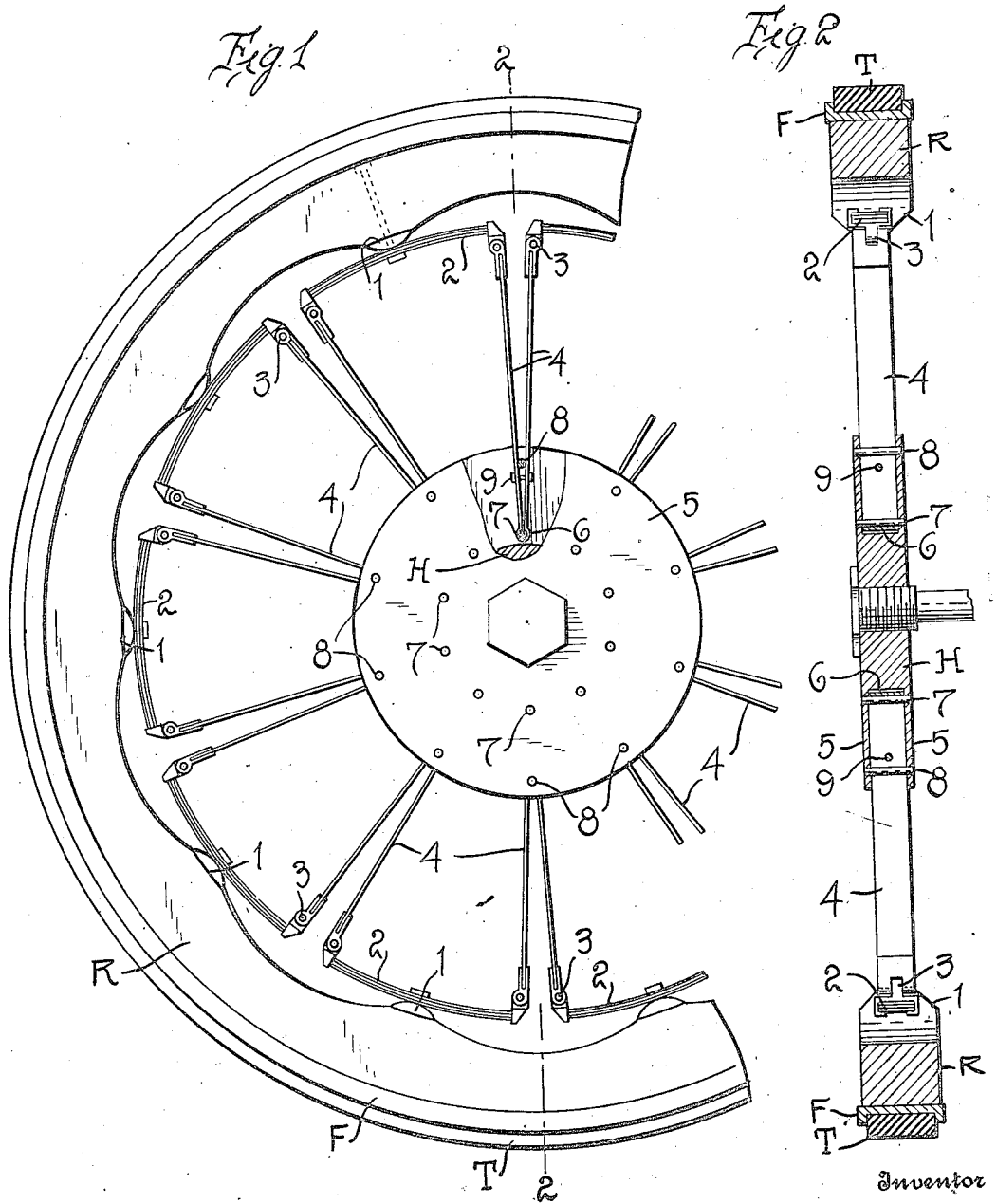

OSKAR THUREN, OF VIRGINIA, MINNESOTA.

WHEEL STRUCTURE.

1,211,504.  Specification of Letters Patent.  Patented Jan. 9, 1917.

Application filed April 27, 1916. Serial No. 93,959.

*To all whom it may concern:*

Be it known that I, OSKAR THURÉN, a citizen of Finland, residing at Virginia, in the county of St. Louis and State of Minnesota, have invented certain new and useful Improvements in Wheel Structures, of which the following is a specification, reference being had to the accompanying drawings.

This invention relates to certain improvements in wheel structures and it is an object of the invention to provide novel and improved means whereby a wheel will possess sufficient resiliency to compensate for the jar or vibrations incident to travel.

The invention consists in the details of construction and in the combination and arragement of the several parts of my improved wheel structure whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a fragmentary view partly in elevation and partly in section illustrating a wheel constructed in accordance with an embodiment of my invention; and Fig. 2 is a sectional view taken substantially on the line 2—2 of Fig. 1, certain of the parts being omitted for clarity in disclosure.

As disclosed in the accompanying drawings, R denotes a rim of predetermined dimensions having secured thereto the felly F with which is engaged the tread member T preferably consisting of a solid rubber tire. The inner wall of the rim R is provided with an annular series of inwardly disposed protuberances or extensions 1 equidistantly spaced and arranged substantially radial of the rim R, and secured intermediate its length to the inner end of each of said extensions or protuberances 1 is a leaf spring 2 arranged longitudinally on a predetermined bow or curvature and pivotally engaged, as at 3, with the opposite extremities of the spring 2 are the spokes 4 and preferably comprising flat springs possessing the requisite strength, and the inner ends of said springs 4 extend between the plates or disks 5 comprised in the hub H.

I find it of advantage to have adjacent spokes or springs 4 formed of a single length of material bent back upon itself at substantially midway its length, the connecting portion 6 coacting with a removable bolt 7 or equivalent means extending through the plates 5, whereby a securing means for the spokes 4 is afforded. I also find it of advantage to have interposed between adjacent springs 4 at a point adjacent the periphery of the disks 5 the spacing bolt or member 8 and to have said adjacent springs 4 tied or connected at a point inwardly of the spacing bolt 8 by the bolt 9 or equivalent means.

It is thought to be clearly apparent that the resiliency of the springs 2 together with the spokes 4 will readily permit the requisite relative movement between the rim R and the hub H to compensate for the jars or vibrations incident to the travel of the wheel.

From the foregoing description, it is thought to be obvious that a wheel structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A wheel structure comprising a rim provided with inwardly directed extensions, a hub, a flat spring member secured midway its length to the inner end of each of the extensions, and spokes interposed between the hub and the opposite end portions of the spring, said spokes being resilient, adjacent spokes being formed of a single length of material bent back upon itself at substantially midway its length.

2. A wheel structure comprising a rim provided with inwardly directed extensions, a hub, a flat spring member secured midway its length to the inner end of each of the extensions, spokes interposed between the hub and the opposite end portions of the spring, said spokes being resilient, adjacent spokes being formed of a single length of material bent back upon itself at substantially midway its length, a member disposed through the hub and coacting with the connecting portions of the adjacent spokes for holding said spokes in operative position relative to the hub, a member carried by the hub and disposed between adjacent spokes for maintaining the same in spaced relation, and a member connecting adjacent spokes at a point inwardly of the spacing member.

In testimony whereof I hereunto affix my signature in the presence of two witnesses.

OSKAR THURÉN.

Witnesses:
  JOHN E. MANTHEY,
  MATT ANDERSON.